United States Patent [19]

Stalter, Jr.

[11] 4,072,550
[45] Feb. 7, 1978

[54] METHOD AND APPARATUS FOR BUILDING A CLOSED TORUS TIRE

[75] Inventor: Joseph F. Stalter, Jr., Mogadore, Ohio

[73] Assignee: The Goodyear Tire & Rubber Company, Akron, Ohio

[21] Appl. No.: 587,184

[22] Filed: June 16, 1975

[51] Int. Cl.² ............................................. B29H 17/00
[52] U.S. Cl. ........................... 156/123 R; 156/128 R; 156/133; 156/400; 156/401
[58] Field of Search .................... 156/123 R, 126, 127, 156/128 R, 128 I, 129, 132, 133, 394 R, 400, 401, 414, 417

[56] References Cited

U.S. PATENT DOCUMENTS

| | | | |
|---|---|---|---|
| 1,918,553 | 7/1933 | Musselman | 156/128 |
| 2,981,310 | 4/1961 | Frohlich et al. | 156/400 |
| 3,044,533 | 7/1962 | Lowe | 156/401 |
| 3,223,566 | 12/1965 | Niclas et al. | 156/123 |
| 3,392,072 | 7/1968 | Alderfer | 156/128 R |
| 3,776,792 | 12/1973 | Grawey | 156/123 |

FOREIGN PATENT DOCUMENTS 731,436  4/1966  Canada .................................. 156/121

*Primary Examiner*—William A. Powell
*Assistant Examiner*—John E. Kittle

*Attorney, Agent, or Firm*—F. W. Brunner; Frank Pincelli

[57] ABSTRACT

A method and apparatus for building a closed torus pneumatic tire in which the components of the tire, exclusive of the belt and tread structures, are wrapped about a cylindrical former, inextensible bead rings are positioned about the former in positions spaced axially apart substantially the same as the final desired axial spacing. The former is radially expanded and expands the carcass structure to clampingly engage the bead rings. Each axially outer end portion of the carcass structures is folded over toward the axial centerplane of the drum in a manner in which the carcass is free of internal restraint at the fold. Each axially outer end of the folded over end portion of the carcass structure freely contracts radially into position to be clamped by a pull-over ring and is pulled axially across the former to a predetermined position past the midcircumferential centerplane of the former and released. A sidewall restraint ring moves into position adjacent the fold to prevent roll back of each end portion. The overlapped center portions of the ply structures are stitched together to form a closed envelope construction. A preformed belt and tread structure is disposed circumferentially about the former with the centerplanes of the belt, tread, and carcass coincident. The envelope is inflated into engagement with the preformed belt and tread structure which are in turn stitched to the carcass.

15 Claims, 12 Drawing Figures

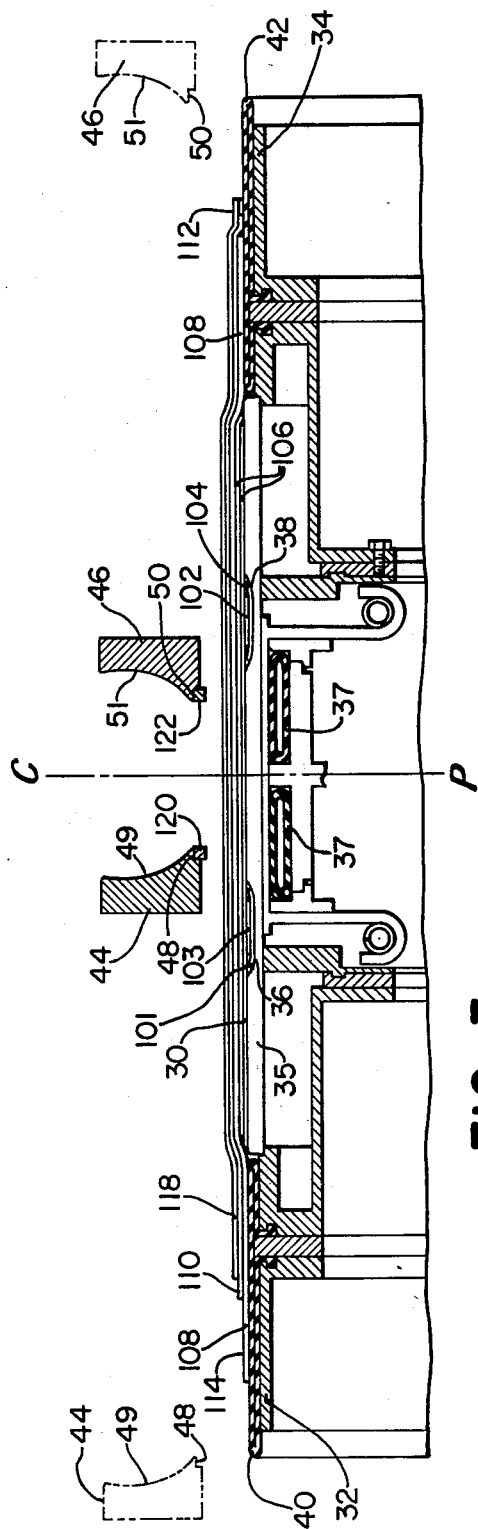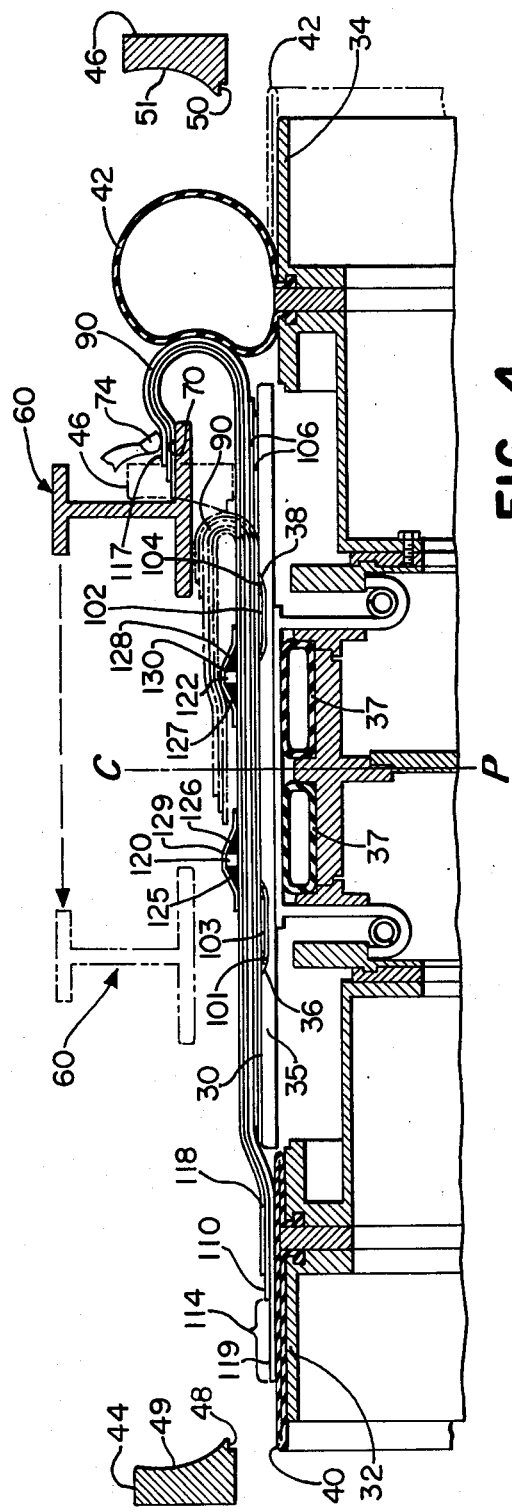

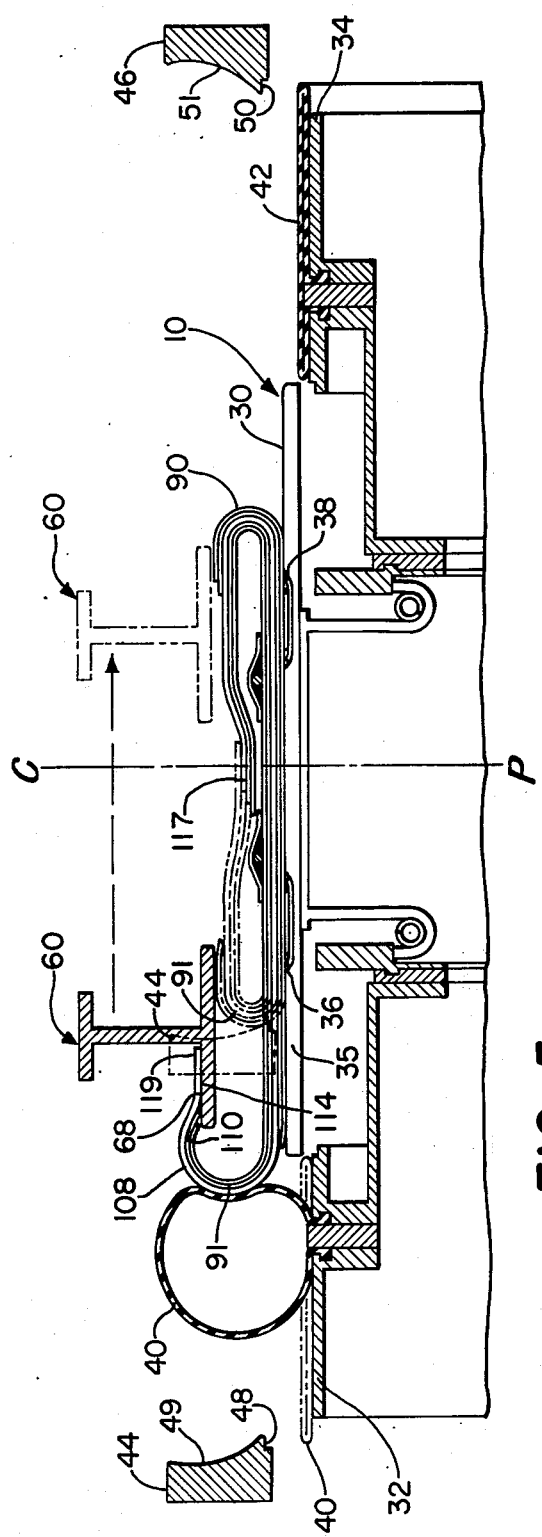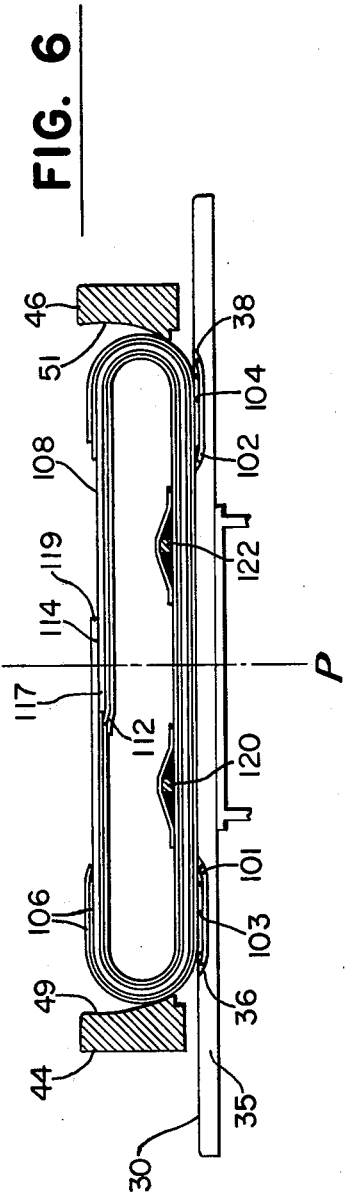

METHOD AND APPARATUS FOR BUILDING A CLOSED TORUS TIRE

The foregoing abstract is not to be taken as limiting the invention of this application, and in order to understand the full nature and extent of the technical disclosure of this application, reference must be made to the accompanying drawing and the following detailed description.

This invention relates to the manufacture of pneumatic tires and in particular to a method and means of building a closed torus pneumatic tire.

Tires commonly known and used today are basically what can be described as an open-bellied, torus-shaped structure. Such tires when viewed in sections containing the rotational axis of the tire are generally horseshoe in configuration and have at their radially inner extremities a pair of annular inextensible bead rings which are engageable with a pair of bead seats on the rim of a wheel. The horseshoe-shaped tire along with the rim of the wheel between the bead seats forms the air cavity for the pneumatic tire.

The present invention relates to the so-called closed torus type tire in which the pneumatic or elastomeric structure of the tire when viewed in sections containing the rotational axis of the tire forms a complete ring and thus provides the entire envelope or air cavity. A method and means is provided for efficiently and accurately constructing the closed torus envelope for such a tire whereby a generally cylindrical cord reinforced carcass structure is provided, a pair of inextensible bead cores are provided circumferentially about the structure. The axially outer end portions of the carcass structure are successively rolled over upon the carcass structure to form a loop and drawn axially across the structure to form a lapped portion and a closed torus chamber. A tread and belt structure is provided about the closed torus structure and the tire is vulcanized.

Other objects will be in part apparent and in part pointed out more in detail hereinafter.

In the drawings:

FIGS. 3-7 are sectional views similar to that in FIG. 2 and illustrating the sequential steps of building a pneumatic tire in accordance with the present invention;

Figure 1:
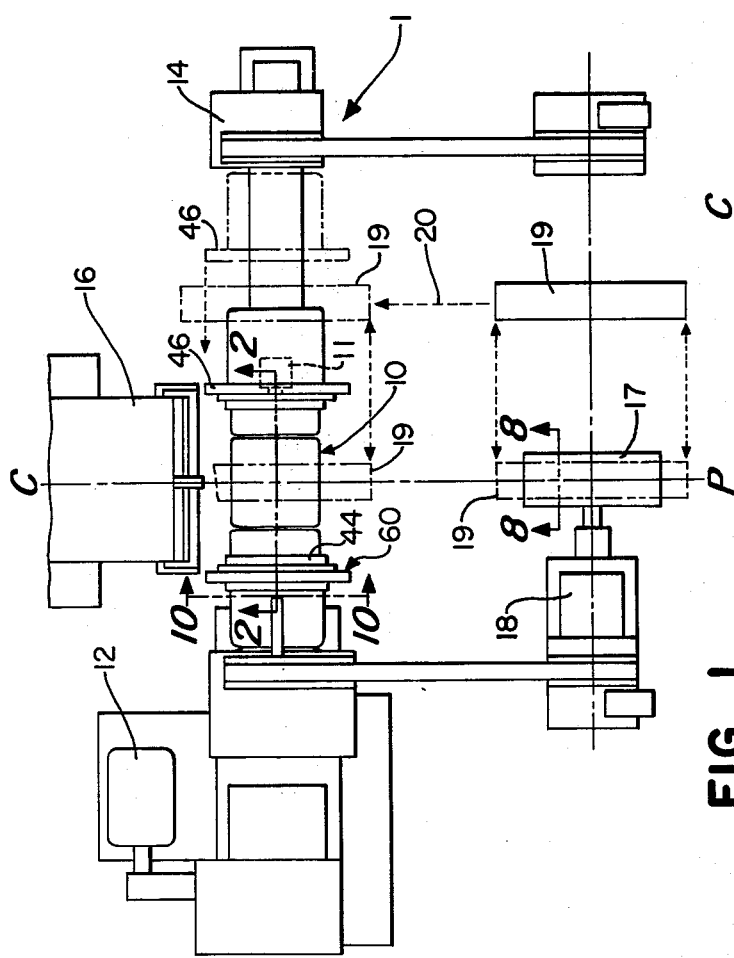
FIG. 1 is a plan view of the apparatus according to the present invention for making a tire in accordance with the method of the present invention.

With reference to the drawings and in particular FIG. 1, there is illustrated a tire building machine 1 including a rotatable, radially expandable tire building drum 10 and drive means 12 for operating the drum 10. A tailstock 14 for supporting the end 11 of the drum 10 opposite the drive means 12 is movable in directions parallel to the rotational axis of the tire building drum into and out of supporting engagement with the drum. For purposes of this specification, the "axis" of a rotatable part or element shall be considered the axis about which the part or element rotates. Server and stitcher mechanisms 16 of any suitable type are provided adjacent the tire building drum 10 for supplying tire components to the drum 10 and stitching them together.

A radially expandable band building drum 17 including drive means 18 for building belt and tread structures is conveniently provided in a position remote from the tire building drum 10. In the particular embodiment illustrated, the rotational axis of the band building drum 17 is parallel to rotational axis of the tire building drum 10. A transfer ring 19 is provided for transferring a preassembled belt and tread structure from the band building drum 17 to the tire building drum 10 by means of overhead rails (not shown) along a dotted line generally illustrated at 20. It will be appreciated that the tailstock 14 is moved axially away from the tire building drum 10 to the position indicated in dotted lines during the operation in which the band transfer ring 19 is moved along the dotted line 20 to a position about the tire building drum 10, as well as during removal of the tire from the tire building drum 10.

Figure 2:
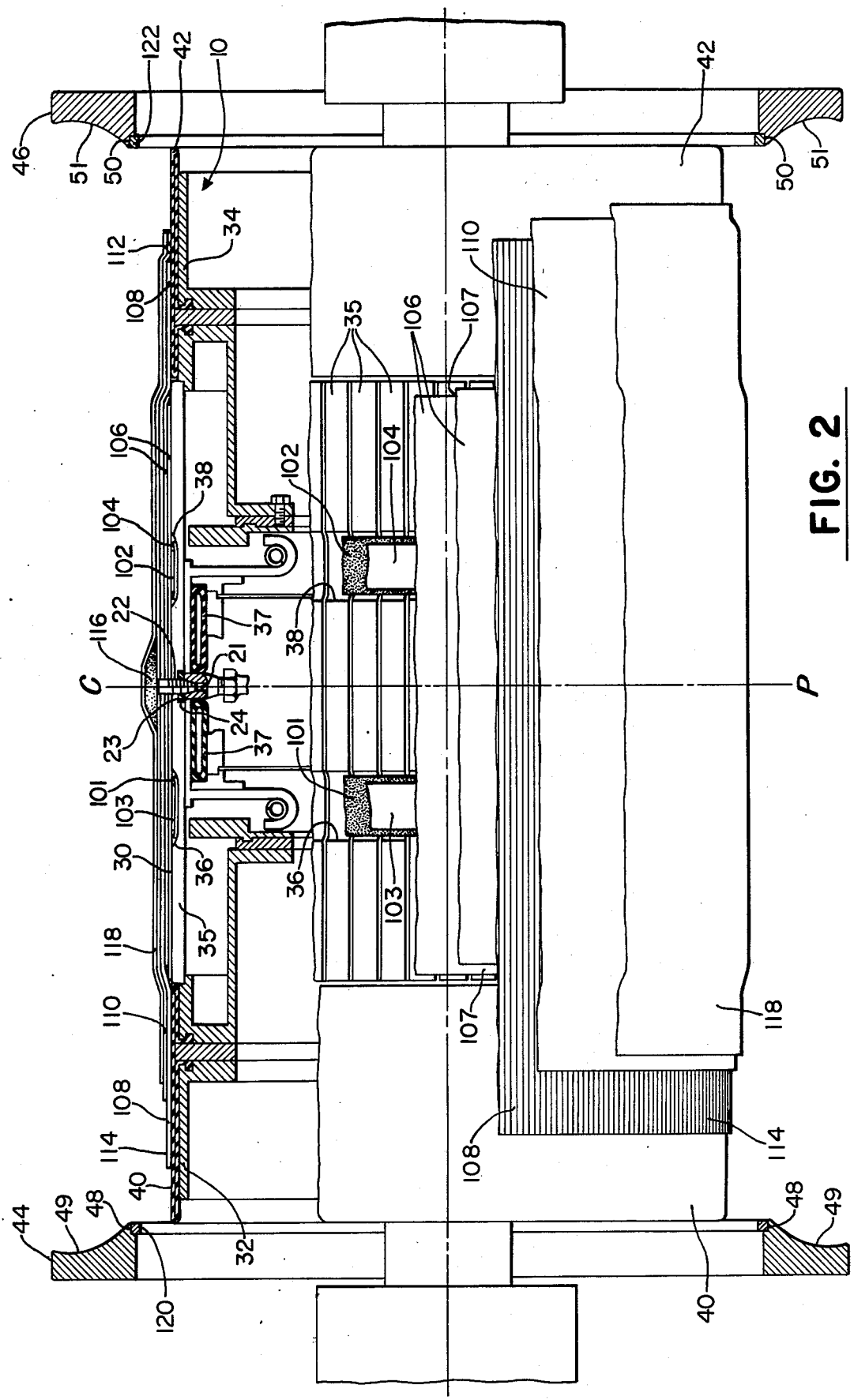
FIG. 2 is a partial sectional view of the tire building drum in FIG. 1, taken substantially along line 2—2 of FIG. 1 with portions broken away.

With reference to FIG. 2 and in the particular embodiment illustrated, the tire building drum 10 includes a generally rigid central portion 30 and a pair of end portions 32 and 34. The central portion 30 includes a plurality of rigid segments 35 which extend in directions parallel to the drum axis and are disposed completely about the circumference of the drum 10 to provide a rigid cylindrical surface. A pair of circumferentially extending grooves 36 and 38 are provided in the radially outer srfaces of the rigid segments 35 to accommodate chipper strips as will be discussed hereinafter. The segments 35 are radially movable to expand the central portion 30 of the drum 10 from a first diameter illustrated in FIG. 2 to a second diameter illustrated in FIG. 4 by inflating a pair of annular air chambers 37. The end portions 32 and 34 include turnup mechanisms 40 and 42 which in the embodiment illustrated are annular inflatable bladders.

Included in the drum 10 and associated with one of the rigid segments 35 is an air passage 21 for communicating with a valve 116 of a tire built on the drum 10. The passage 21 is connected to a source of pressurized air (not shown) and includes passage 22 extending through one segment 35. An elastomeric O-ring seal 24 is provided in an annular recessed seat 23 at the radially inner end of the passage 22 for sealing engagement with the valve 116 when the valve 116 is inserted through the passage 22 in the segment 35.

Annular sidewall guide rings 44 and 46 are disposed coaxially with respect to the tire building drum 10 and movable in axial directions with respect thereto. The precise axial positioning of the sidewall guide means in predetermined locations along the drum 10 can be accomplished by any suitable means. The sidewall guide rings 44 and 46 include a means 48 and 50, rrespectively, for supporting an annular bead ring to move the bead ring into coaxial position about the tire building drum. The axially inner surface 49 and 51 of each ring 44 and 46 is profiled or concave when viewed in cross-section to conform to the desired sidewall profile of the uncured inflated tire built on the drum 10.

Figure 10:
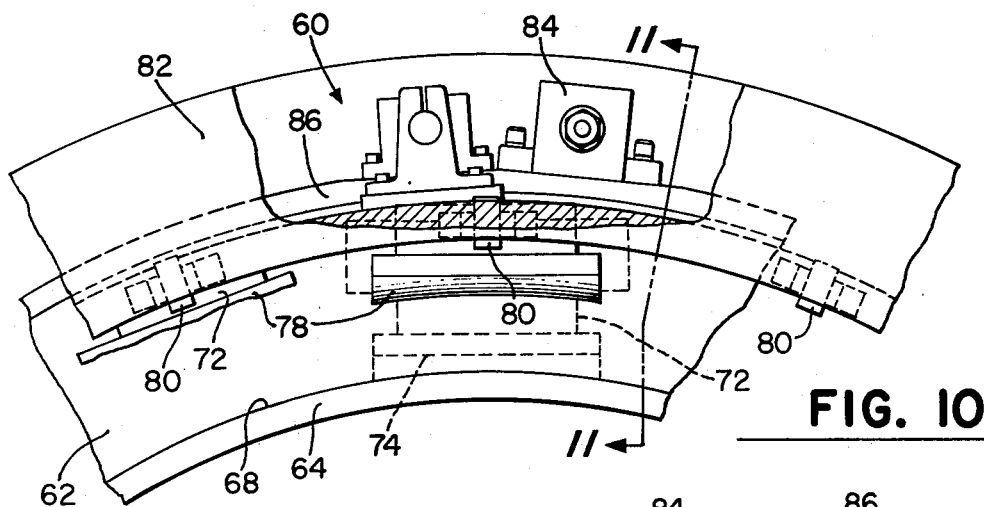
FIG. 10 is a partial sectional view with portions broken away of the pullover mechanism illustrated in FIG. 1, taken substantially along line 10—10 of FIG. 1.
Figure 11:
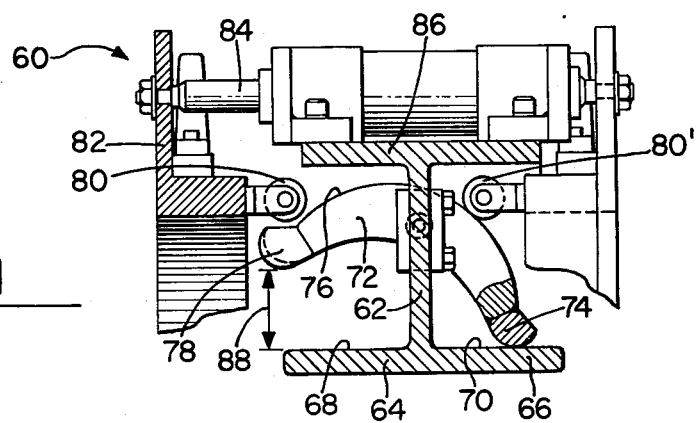
FIG. 11 is a partial sectional view of the pullover mechanism of FIG. 10 taken substantially along line 11—11 of FIG. 10.
Figure 12:
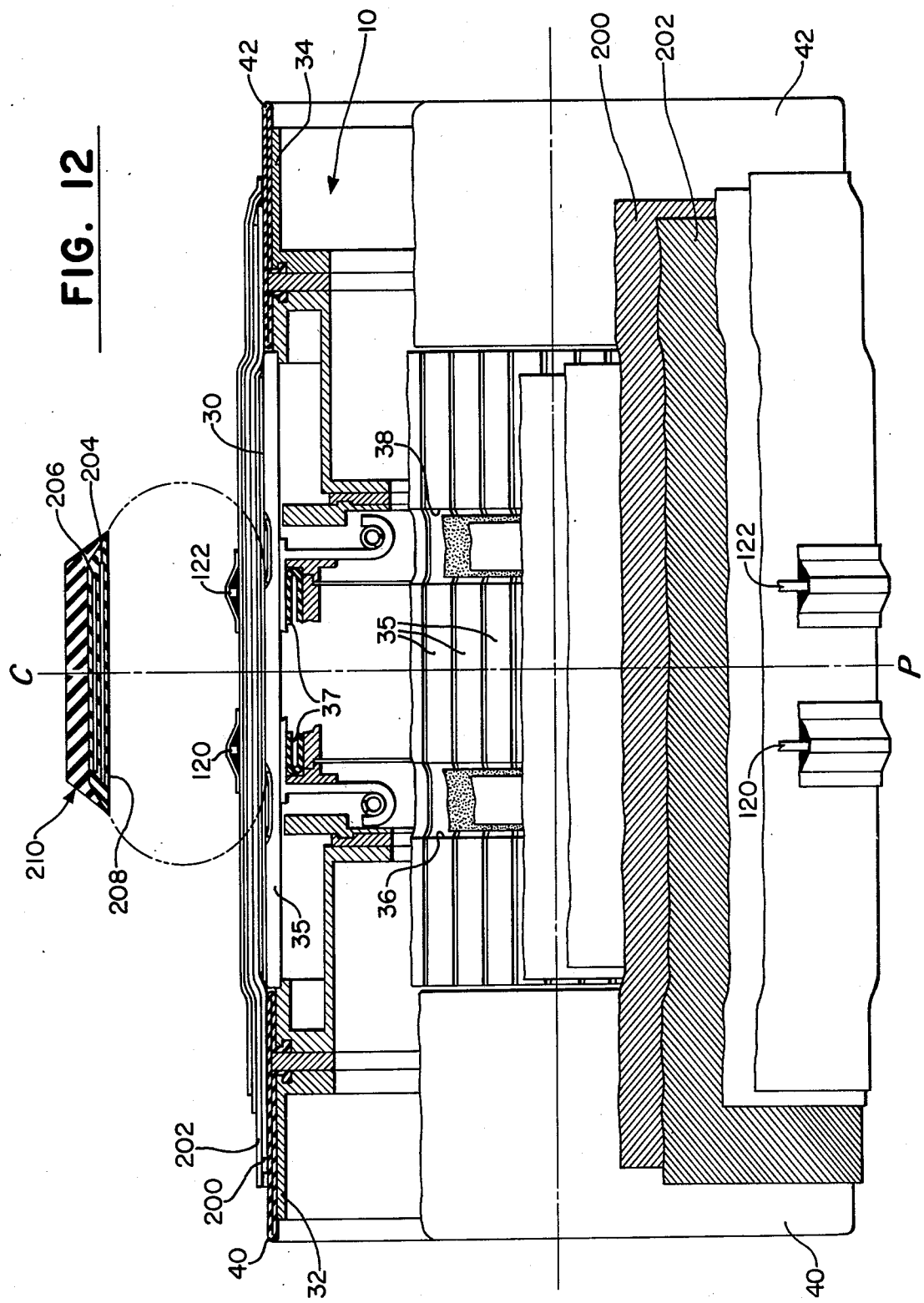
FIG. 12 is a cross-sectional view of the building operation illustrated in FIGS. 1-8, but illustrating in condensed form the construction of a bias ply tire.

With reference to FIG. 1 and in accordance with the present invention, a band pullover ring 60 is disposed coaxially with respect to the tire building drum 10 and movable in axial directions with respect thereto. More particularly and with reference to FIGS. 10 and 11, the pullover ring 60 as viewed in cross-section is in the form of an inverted T including a vertical leg 62 and a pair of horizontally or axially extending legs 64 and 66. Each axially extending leg 64 and 66 has a radially outer clamping surface 68 and 70, respectively, which extends continuously about the pull over ring 60.

A plurality of clamping linkages 72 and 74 are mounted on the vertical leg 62 for pivotal movement in planes containing the axis of the drum 10 such that they can move into and out of clamping engagement with the clamping surfaces 68 and 70, respectively. A description of one linkage and clamping mechanism will suffice for all linkage and clamping mechanisms disposed about the ring 60.

The linkage 72 has a radially outer cam follower surface 76 and a clamping bar 78. A roller cam 80 is mounted on a ring 82 which is movable in axial directions with respect to the drum 10 and pullover ring 60 by means of air cylinders 84 mounted on the radially outer surface of an annular support 86 rigidly secured to the radially outer edge of the T section 62. The cam follower 80 is shown in a disengaged position with respect to the linkage mechanism 72 and thus the mechanism 72 is out of engagement with the clamping surface 68. The cam follower 80' is illustrated in its engaged position with respect to the linkage mechanism 74 and thus the linkage mechanism 74 is illustrated in engaged position with respect to the surface 70. Any convenient resilient means can be utilized to urge the linkage mechanisms out of engagement with the clamping surface 68 and 70, respectively, when the cam follower is retracted to the position illustrated at 80.

Each linkage 72 and 74 is of proper dimension and rotates about an axis such that there is sufficient open space 88 between the respective clamping surface and the linkage in the open position that the end of a fabric tire component can be readily rotated in position on the respective clamping surface 68 or 70.

With reference to FIG. 2 and in building a tire in accordance with the present invention, the drum 10 is first arranged in its radially contracted configuration. In the particular method illustrated, a pair of uncured rubber chafer strips 101 and 102 are wrapped circumferentially about the tire building drum 10 in the respective grooves 36 and 38. The chafer strips 101 and 102 are spaced equally from and on axially opposite sides of the mid-circumferential centerplane CP. The mid-circumferential centerplane is a central reference plane with respect to the tire being built and perpendicular to the axis of the tire. A pair of fabric-reinforced chipper strips 103 and 104 are wrapped circumferentially about the rubber chafer strips 101 and 102. Two turns of uncured rubber sidewall stock 106 are provided circumferentially about the drum and extend continuously in axial directions to points axially outwardly of chafer strips 103 and 104 such that they will form the sidewall rubber of the tire in the final torus shaped configuration. The rubber 106, therefore, will extend from beneath the shoulder portions of the tread down both sidewalls and continuously beneath the beads. In order to provide a smooth transition at the axially outer edge of the sidewall stock a small axial offset as at 107 is provided.

A ply 108 of axially extending tire cords imbedded in uncured rubber is wrapped circumferentially about the drum and extends in axial directions axially outward beyond both axially outer edges of the sidewall rubber 106. The axial length of the ply 108 is greater than the cross-sectional contour length of the carcass in the finished tire in order to provide an overlap of the carcass ply in the area of the tread. It is preferred that the ply 108 be centered with respect to the mid-circumferential centerplane CP to assure that the lap will be centered under the tread.

A first innerline ply 110 of vulcanizable elastomeric material is wrapped circumferentially about the carcass ply 108. The innerliner 110 is narrower than the ply 108 and is axially offset to one side by a slight amount in the order of about one inch as at 112. The liner 110 is of sufficiently less axial length than the ply 108 to provide an open or free annular surface 114 at one axially outer end of the ply 108 of a width about equal to the desired overlap in the ply 108 beneath the tread portion of the tire.

An awl or other sharp instrument is then used to penetrate the liner 110, ply 108, and sidewall rubber 106, to permit insertion of the valve 116 into the passage 22 and into sealing engagement with the O-ring 24. A second layer of uncured innerliner rubber 118 is then wrapped circumferentially about the drum and is again laterally offset with respect to the first innerliner ply 110 in the same direction as the lateral offset of the layer 110 is with respect to the carcass ply 108. Again, an awl is used to penetrate the liner 118 to provide an air passage through to the valve 116.

With reference to FIG. 3, a pair of bead rings 120 and 122 which had been previously secured in the bead seats 48 and 50 of the annular sidewall rings 44 and 46 are moved axially toward each other over the drum 10 to predetermined axially spaced positions about the drum 10. The axial spacing is the same as that in the finished tire and they are located equidistant from the mid-circumferential centerplane CP of the tire. The central portion 30 of the drum 10 is then expanded radially into engagement with the annular beads 120 and 122 to secure their relative axial positions. The beads 120 and 122 are then released from the annular sidewall rings 44 and 46 and the sidewall rings are then moved axially outwardly with respect to each other to their respective positions indicated in dotted lines.

With reference to FIG. 4, wedge strips 125–128 are wrapped circumferentially about the drum 10 adjacent each of the sides of the bead rings 120 and 122. Cover strips 129 and 130 are wrapped about the respective bead rings 120 and 122 and their associated wedge strips.

A suitable releasing agent such as zinc stearate is provided over the entire axially central portion of the carcass structure and outward in axial directions such that it covers all of the inner surface of the carcass structure destined to form the at least radially inner one-half of the tire cross-section. Care must be taken to avoid getting any releasing agent on close to the open or free surface 114 on the ply 108 as this will reduce adhesion between the confronting surfaces of the ply in the overlap area.

The pullover ring assembly 60 is then moved axially across the drum 10 to the position illustrated in solid lines in FIG. 4. The axially outer end portion 117 of the carcass structure on the end thereof which includes the slight offset 112 of the liner ply 110 with respect to the carcass ply 108 is radially expanded by means of a bladder 42 as illustrated in FIG. 4. It has been discovered that when the ply structure is expanded and forced axially toward the pullover mechanism 60 that the axially outer extremity or end of the ply structure will flop or roll over onto the clamping surface 70. The axially outer end is thus rolled over or turned through an angle of at least 90° from parallel to the axis of the carcass structure and in the specific process illustrated is rotated through about 180°. The respectively associated clamping bar 74 is then rotated into clamping engagement with the surface 70 to firmly grip the axially outer end of the ply or carcass structure. Pullover mechanism 60 is then moved axially across the drum 10 to draw the ply structure axially across the central portion of the carcass structure to a predetermined position that will provide the desired overlap of the ply 108 beneath the tread. For purposes of this invention, the central portion of the carcass structure is that portion between the bead cores 120 and 122.

As illustrated in FIG. 4, in chain-dotted lines, the bladder 42 is deflated and the respectively associated sidewall guide ring 46 is moved axially toward the folded over ply portion to a predetermined position to prevent roll-back of the ply structure when released by the pullover mechanism 60. When the end 117 is released by the pullover mechanism 60 and the pullover mechanism 60 is moved axially away to the position illustrated in dotted lines, the ply structure will contract radially into a position about the central portion of the drum with the sidewall guide ring 46 maintaining the position of the fold or loop 90 as illustrated in FIG. 4.

As seen in FIG. 5 and in like manner, the axially opposite end 119 of the carcass structure is expanded radially by means of a bladder 40 until the end portion 119 rolls over and lays on the gripping surface 68 of the pullover mechanism 60. The axially outer end portion 119 is then pulled axially across the drum 10 to a predetermined lapping relationship illustrated with the first axially outer end portion. The bladder 40 is deflated and the respectively associated sidewall guide ring 44 is moved into predetermined position with respect to the fold or loop 91 in the carcass structure to resist roll-back of the carcass structure when released from the pullover mechanism 60. It will be observed that in rolling the axially outer ends of the carcass structure over and axially across the rest of the carcass structure, the internal surface of the carcass structure in the areas of the folds or loops 90 and 91 are free of internal support.

When the end portion 119 is released from the pullover mechanism 60 and the pullover mechanism 60 is moved axially out of the way, the end portion 119 will contract radially about the end portion 117 as illustrated in FIG. 5. The free or open surface 114 of the carcass ply 108 is in contact with the other end of the carcass ply 108 and being free of any releasing agent can be tightly stitched and secured thereto, thus providing a firm, secure splice in the carcass ply 108 beneath the tread portion of the tire.

Figure 8:
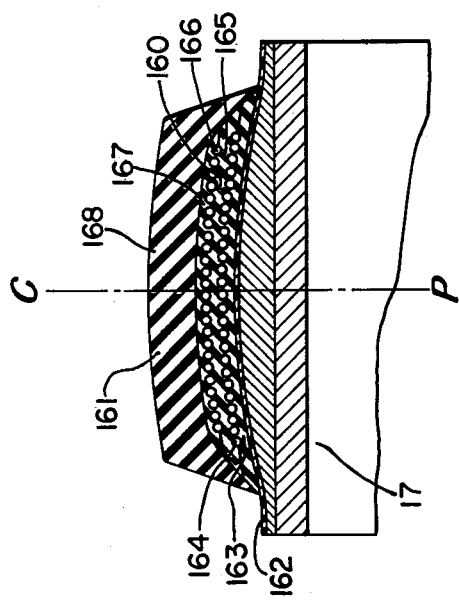
FIG. 8 is a partial sectional view of the band building drum of FIG. 1 taken substantially along line 8—8 of FIG. 1 and illustrating the building of the belt and tread structure.

With reference to FIG. 8, a belt structure 160 and tread portion 161 is built on the radially expandable band-building drum 17. In the particular embodiment illustrated, the belt structure is comprised of cords extending circumferentially about the drum at an angle of substantially zero degrees with respect to the mid-circumferential centerline of the drum. Since the belt structure is essentially zero degrees, there can be very little shaping or expansion of the belt structure once it has been built. For this reason, the particular drum illustrated includes a crowned central portion for providing the desired contour of the belt structure. If a bias ply belt structure is utilized, the drum 17 need not be crowned since this type belt structure can expand to the desired contour of the mold and tire.

A thin wrap of polyethylene 162 is provided about the drum 17 in its expanded state to facilitate release of the belt structure from the drum. The belt structure is provided by winding a first layer 163 of unvulcanized rubber about the polyethylene 162 on the expanded drum 17. A wire cord is helically wound about the first layer 163 in a plurality of turns to form the first belt ply 164. A second layer of unvulcanized rubber 165 is wrapped circumferentially about the first belt ply 164 and a second wire cord is similarly helically wound about the second layer of unvulcanized rubber 165 in a plurality of turns to form the second belt ply 166. A third layer of unvulcanized rubber 167 is then wrapped circumferentially about the second belt ply 166. Finally, a thick layer 168 of tread stock is wrapped circumferentially about the belt structure.

Referring to FIG. 1, the transfer ring 19 is moved to a position, shown in dash lines, where it is centered coaxially about the band-building drum 17 and grips the tread and band structure in a known manner. The tailstock 14 is moved axially away from the drum to the position shown in dotted lines. The drum 17 is radially contracted and the transfer ring moves along the dotted line 20 to a position, shown in dotted lines, centered coaxially about the mid-circumferential centerline of the previously built tire carcass on the drum 10. The tailstock is then moved into supporting relationship with the end of the drum 10.

The tire carcass is then partially expanded to about one-half of its final section height as best illustrated in FIG. 6. The sidewall guide rings 44 and 46 are moved axially inwardly to predetermined positions spaced equally from and on opposite sides of the mid-circumferential centerplane to engage the sides of the partially inflated carcass structure to assure the symmetrical position of the carcass structure with respect to the mid-circumferential centerplane. It will be appreciated that the symmetrical position could be checked by an appropriate means and if the position of the carcass is accurate this step of centering the carcass with the sidewall guide rings after partial inflation can be left out.

Figure 7:
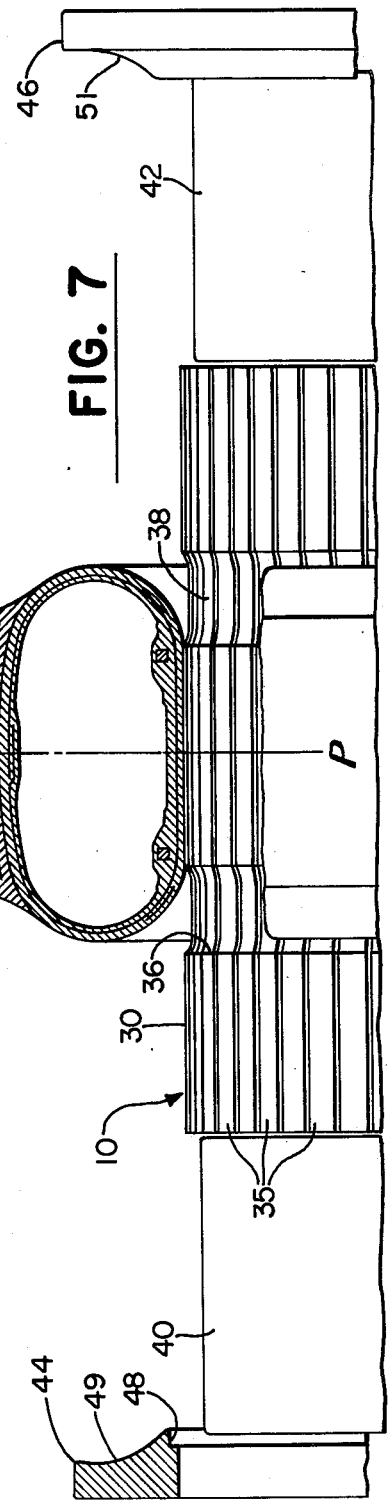

The carcass structure is then further inflated into engagement with the tread and belt structure. It has been found that if the carcass structure is centered with respect to the mid-circumferential centerplane after partial inflation the carcass structure will expand to an axially centered position without further adjustment as by means of sidewall guide rings 44 and 46. The tread and belt structure is then stitched tightly to the carcass structure, as shown in FIG. 7. The tailstock 14 moved out of engagement with the drum 10, and the drum 10 is radially contracted to permit removal of the completely built uncured tire carcass.

Figure 9:
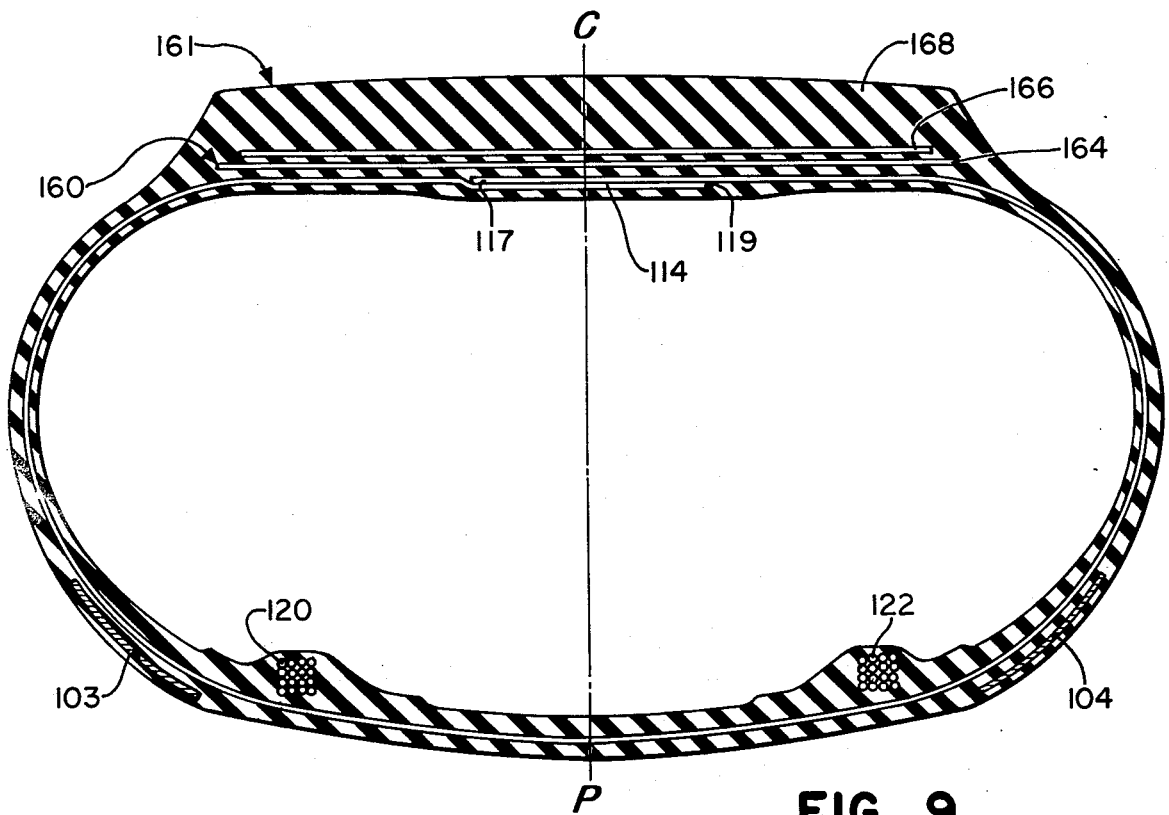
FIG. 9 is a cross-sectional view of a tire manufactured in accordance with the present invention.

The tire is then placed in a mold and cured under heat and pressure. The completed tire mounted on a rim and inflated would appear generally as illustrated in FIG. 9.

It will be appreciated that closed torus tires of a bias-ply structure can also be built in accordance with the present invention. Particularly, with reference to FIG.

12, there is illustrated a bias-ply tire built up in the same manner as the radial-ply tire discussed with respect to FIGS. 2–8. The primary difference is that in place of the radial carcass ply 108, there is provided a pair of bias plies 200,202. Also, the belt structure utilized with respect to the particular bias-ply tire illustrated has two layers of bias-ply tire cord fabric 204,206. It will be observed that the inner surface 208 of the tread and belt assembly 110 is straight as viewed in cross-section. This is permissible when bias plies are used in the belt structure since bias plies are capable of expansion to conform to the contour of the mold.

While various specific tire structures have been illustrated in conjunction with the present process and apparatus, it will be appreciated that more or less or different tire components could be utilized in the building of the closed torus tire structure and that various sequences of operations and orientations of components can be rearranged. For example, a bias-ply belt structure could be substituted for the zero degree belt structure on the radial ply tire. Similarly, a zero degree belt structure could be substituted for the bias-belt structure on the bias-ply tire.

It can be seen that a novel method and apparatus has been provided for conveniently and efficiently manufacturing a closed torus pneumatic tire having a pair of inextensible beads and a cord reinforced carcass structure in which the plies of the carcass are overlapped beneath the tread portion of the tire. This process is accomplished without the use of internal restraints in the areas of the fold-over of the carcass plies during the building operation which internal restraints must be somehow removed or disposed of subsequent to the folding.

While certain representative embodiments and details have been shown for the purpose of illustrating the invention, it will be apparent to those skilled in the art that various changes and modifications may be made therein without departing from the spirit or scope of the invention.

What is claimed is:

1. A method of manufacturing a closed torus pneumatic tire comprising:

forming a generally cylindrical carcass structure including at least one cord reinforced ply;

positioning a pair of inextensible bead cores coaxially about said cylindrical carcass structure and located in axial directions with respect to the carcass structure substantially in the position they will assume in the completed tire;

forming a first fold in said carcass structure without the aid of any internal restricting devices by radially expanding one axially outer end portion of said carcass structure by bladder means, drawing said one axially outer end portion axially across the central portion of said carcass structure to a predetermined axial position with respect to the bead portions by means of an annular ring having a radially outer annular surface for receiving a rolled-over end of said carcass structure and means for clamping said rolled-over end to said surface to thereby provide for the precise positioning in axial directions of the first fold portion with respect to one said bead core with the fold being free of internal restraint and releasing said one axially outer end portion;

forming a second fold in said carcass structure without the aid of any internal restricting devices by radially expanding one axially outer end portion of said carcass structure by bladder means, drawing said other axially outer end portion axially across the central portion of said carcass structure to a predetermined axial position with respect to the bead portions by means of an annular ring having a radially outer annular surface for receiving a rolled-over end of said carcass structure and means for clamping said rolled-over end to said surface to thereby provide for the precise positioning in axial directions of the second fold portion with respect to the other said bead core with the fold being free of internal restraint to form a lapped portion with said first end portion and releasing said other axially outer end portion;

adhering said lapped portion together to form a closed torus chamber;

providing a belt and tread rubber on said closed torus chamber; and shaping the chamber to the desired configuration and vulcanizing the tire.

2. A method as claimed in claim 1, including providing means external and axially adjacent the respective fold portions when each end portion is released to limit roll-back of the carcass structure and assure the axial positioning of the fold portion.

3. A method as claimed in claim 2, wherein said closed torus chamber is partially inflated and said closed torus chamber is centered in axial directions with respect to said pair of bead rings by exerting an axial force on the external surface of the carcass in the direction of the desired movement of the carcass structure.

4. A method as claimed in claim 1, wherein said belt structure and tread rubber are preformed and, after said closed torus chamber is formed, said belt structure and tread rubber are positioned coaxially about said closed torus chamber and said closed torus chamber is inflated into engagement with said belt structure and said belt structure is firmly adhered to said closed torus chamber.

5. A method as claimed in claim 3, wherein said belt structure and tread rubber are preformed and, after said closed torus chamber is formed, said belt structure and tread rubber are positioned coaxially about said closed torus chamber and said closed torus chamber is inflated into engagement with said belt structure and said belt structure is firmly adhered to said closed torus chamber.

6. A method of manufacturing a closed torus pneumatic tire comprising:

forming a generally cylindrical carcass structure including at least one cord reinforced ply;

positioning a pair of inextensible bead cores coaxially about said cylindrical carcass structure and spaced in axial directions with respect to the carcass structure substantially in the position they will assume in the completed tire;

radially expanding one axially outer end portion of said carcass structure by bladder means, drawing said one axially outer end portion without the aid of any internal restricting devices axially across the central portion of said carcass structure and forming a loop;

providing a first external guide means adjacent said first loop to assure the precise axial positioning of said loop;

releasing said one axially outer end portion;

radially expanding the other axially outer end portion of said carcass structure by bladder means, drawing said other axially outer end portion without the aid of any internal restricting devices axially across the central portion of said carcass structure to form a second loop and a lapped portion with said first end portion;

providing a second external guide means adjacent said second loop to assure the precise axial positioning of said loop;

releasing said other axially outer end portion;

adhering the end portions together at said lapped portion to form a closed torus chamber;

positioning a preformed annular belt structure coaxially about said carcass structure;

inflating said closed torus chamber into engagement with said preformed belt structure and firmly adhering said belt structure to said torus chamber; and providing tread rubber on the belt structure and vulcanizing the tire.

7. A method of building a closed torus pneumatic tire comprising:

building a generally cylindrical cord reinforced structure;

providing a pair of inextensible bead cores coaxially about said structure and adhered thereto in axially spaced apart positions substantially the same as they will assume in the completed tire;

radially expanding one axially outer end portion of said carcass structure by bladder means causing said one axially outer end of said structure to rotate through an angle greater than 90° from parallel to the axis of the structure by expanding said one axially outer end by exerting radially outwardly and axially inwardly directed forces on the radially inner surface thereof;

gripping said one axially outer end and drawing said one axially outer end axially across said structure without the aid of any internal restraining devices forming a loop;

radially expanding the other axially outer end portion of said carcass structure by bladder means causing said other axially outer end of said structure to rotate through an angle greater than 90° from parallel to the axis of the structure by expanding said other axially outer end by exerting radially outwardly and axially inwardly directed forces on the radially inner surface thereof;

gripping said other axially outer end and drawing said other axially outer end across said structure without the aid of any internal restraining devices forming a loop, and a lapped portion with said one axially outer end;

adhering the axially outer ends together at said lapped portion to form a closed torus chamber;

providing a tread structure; shaping the assembly to a tire form; and, vulcanizing the tire.

8. A method as claimed in claim 1, wherein each axially outer end is caused to rotate through about 180° from parallel to the rotational axis before being drawn axially across said structure.

9. A method as claimed in claim 8, including providing means external to and axially adjacent the respective loop to resist roll-back of the respective end portion after it is drawn axially across the structure.

10. A method as claimed in claim 9, including, after the end portions are adhered together at the lapped portion, partially inflating the closed torus and adjusting the axial center of said closed torus with respect to the bead cores by exerting axial forces on the external surface of the closed torus in the desired direction of movement of the closed torus structure.

11. A method as claimed in claim 10, wherein said tread structure is provided by, assembling a belt structure, wrapping tread rubber about said belt structure, disposing the belt and tread structure coaxially about said closed torus, and expanding said closed torus into engagement with said belt structure.

12. An apparatus for building a pneumatic tire comprising a generally cylindrical, expandable building drum which is rotatable about an axis, means for expanding each axially outer end of a tire carcass built on said drum to cause said axially outer end to rotate through substantially 180°, means for gripping the expanded rotated axially outer ends of the carcass structure and pulling said axially outer end across the central portion of said carcass structure, said means for gripping comprising an annular ring having a radially outer annular surface for receiving a rolled-over end of a carcass ply and including means for clamping said rolled-over end to said surface, said ring disposed coaxially with respect to said drum and movable in axial directions with respect to said drum, said ring when viewed in sections containing the rotational axis of said drum is generally T-shaped with the crossbar of the T comprising the radially inner extremity of said ring, each radially outer annular surface of said cross-bar comprising a clamping surface for receiving a rolled-over end of a carcass ply and including a means for clamping said outer end of said carcass ply to said surface.

13. Apparatus as claimed in claim 12, wherein said clamping means comprises a plurality of linkages having a clamping bar at one end thereof and rotatable about respective axes at the other end thereof, the axes being perpendicular to the rotational axis of the drum and the linkages being rotatable in planes containing the rotational axis of the drum to clampingly engage a ply structure disposed adjacent the clamping surface.

14. Apparatus as claimed in claim 13, further including a cam follower surface on each linkage, an actuating ring extending circumferentially about said drum and mounted for movement in axial directions toward and away from the said cam followers, and a plurality of cams mounted on said ring for engagement with said cam followers when said actuating ring is moved toward said cam followers to move the clamping bars into clamping position with respect to said surfaces.

15. Apparatus as claimed in claim 13, further including a pair of annular sidewall guide rings disposed coaxially with respect to the axis of the drum and mounted for movement in axial directions with respect thereto into predetermined positions.

* * * * *